United States Patent
Pham et al.

(10) Patent No.: US 11,501,157 B2
(45) Date of Patent: Nov. 15, 2022

(54) ACTION SHAPING FROM DEMONSTRATION FOR FAST REINFORCEMENT LEARNING

(71) Applicant: INTERNATIONAL BUSINESS MACHINES CORPORATION, Armonk, NY (US)

(72) Inventors: Tu-Hoa Pham, Tokyo (JP); Don Joven Ravoy Agravante, Tokyo (JP); Giovanni De Magistris, Tokyo (JP); Ryuki Tachibana, Yokohama (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1064 days.

(21) Appl. No.: 16/048,697

(22) Filed: Jul. 30, 2018

(65) Prior Publication Data
US 2020/0034705 A1    Jan. 30, 2020

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC ........... G06N 3/08; G06N 3/04; G06N 3/0454
See application file for complete search history.

(56) References Cited

U.S. PATENT DOCUMENTS

| 8,943,008 B2 | 1/2015 | Ponulak et al. |
| 9,530,412 B2 | 12/2016 | Selfridge |
| 9,858,529 B2 | 1/2018 | Adams et al. |

(Continued)

FOREIGN PATENT DOCUMENTS

| CN | 107463878 | 12/2017 |
| EP | 3 242 255 | 8/2017 |

OTHER PUBLICATIONS

Chen (Chen et al., "Decentralized Non-communicating Multiagent Collision Avoidance with Deep Reinforcement Learning", 2017 IEEE International Conference on Robotics and Automation (ICRA), May-Jun. 2017, pp. 285-292.) (Year: 2017).*

(Continued)

*Primary Examiner* — Daniel T Pellett
(74) *Attorney, Agent, or Firm* — Tutunjian & Bitetto, P.C.; Randy Emilio Tejeda

(57) ABSTRACT

A method is provided for reinforcement learning. The method includes obtaining, by a processor device, a first set and a second set of state-action tuples. Each of the state-action tuples in the first set represents a respective good demonstration. Each of the state-action tuples in the second set represents a respective bad demonstration. The method further includes training, by the processor device using supervised learning with the first set and the second set, a neural network which takes as input a state to provide an output. The output is parameterized to obtain each of a plurality of real-valued constraint functions used for evaluation of each of a plurality of action constraints. The method also includes training, by the processor device, a policy using reinforcement learning by restricting actions predicted by the policy according to each of the plurality of action constraints with each of the plurality of real-valued constraint functions.

20 Claims, 7 Drawing Sheets

(56) References Cited

U.S. PATENT DOCUMENTS

| | | |
|---|---|---|
| 2017/0213150 A1 | 7/2017 | Arel et al. |
| 2017/0228641 A1 | 8/2017 | Sohn |
| 2017/0293844 A1 | 10/2017 | Gombolay et al. |
| 2017/0337682 A1 | 11/2017 | Liao et al. |
| 2018/0012137 A1 | 1/2018 | Wright et al. |
| 2019/0019080 A1* | 1/2019 | Claessens ............ G06Q 50/06 |
| 2019/0019087 A1 | 1/2019 | Fukui |

OTHER PUBLICATIONS

Hwang (Hwang et al., "Inverse Reinforcement Learning based on Critical State", 16th World Congress of the International Fuzzy Systems Association (IFSA) 9th Conference of the European Society for Fuzzy Logic and Technology (EUSFLAT), Jun.-Jul. 2015, pp. 771-775.) (Year: 2015).*

Johnson (Johnson et al., "Semi-Supervised Nonlinear Distance Metric Learning via Forests of Max-Margin Clustering Hierarchies", arXiv, Feb. 2014, 11 pages.) (Year: 2014).*

Judah (Judah et al., "Reinforcement Learning Via Practice and Critique Advice", Proceedings of the Twenty-Fourth AAAI Conference on Artificial Intelligence, Jul. 2010, pp. 481-486.) (Year: 2010).*

Zhu (Zhu et al., "Combining Dynamic Reward Shaping and Action Shaping for Coordinating Multi-Agent Learning", 2013 IEEE/WIC/ACM International Conferences on Web Intelligence (WI) and Intelligent Agent Technology (IAT), Nov. 2013, pp. 321-328.) (Year: 2013).*

Datta (Datta et al., "Probabilistic Constraint Handling in the Framework of Joint Evolutionary-Classical Optimization with Engineering Applications", Kanpur Genetic Algorithms Laboratory (KanGAL), Mar. 2012, 8 pages.) (Year: 2012).*

Price, Bob,et al. "Accelerating Reinforcement Learning through Implicit Imitation", Journal of Artificial Intelligence Research 19, AI Access Foundation. Dec. 2003, pp. 569-629.

Bansal, Trapit, et al. "Emergent Complexity via Multi-Agent Competition", Published as a conference paper at ICLR 2018, arXiv:1710.03748v3. Mar. 14, 2018, pp. 1-12.

Lin, Zhiyu, et al. "Explore, Exploiter Listen: Combining Human Feedback and Policy Model to Speed up Deep Reinforcement Learning in 3D Worlds", Association for the Advancement of Artificial Intelligence, arXiv:1709.03969. Sep. 12, 2017, pp. 1-8.

U.S. Office Action issued in U.S. Appl. No. 16/048,810 dated Aug. 20, 2021, pp. 1-82.

Achiam et al., "Constrained Policy Optimization", Proceedings of the 34 th International Conference on Machine Learning, Aug. 2017, 18 pages.

Bakker et al., "Hierarchical Reinforcement Learning Based on Subgoal Discovery and Subpolicy Specialization", Proceedings of the 8-th Conference on Intelligent Autonomous Systems, May 2009, 8 pages.

Barto, Andrew G., "Recent Advances in Hierarchical Reinforcement Learning", Discrete Event Dynamic Systems Theory and Applications (DISC), Kluwer Academic Publishers, Mar. 1999, pp. 41-77.

Berseth et al., "Progressive Reinforcement Learning with Distillation for Multi-Skilled Motion Control", Published as a conference paper at ICLR 2018, May 2018, pp. 1-15.

Duan et al., "Benchmarking Deep Reinforcement Learning for Continuous Control", Proceedings of the 33rd International Conference on Machine Learning, Jun. 2016, 10 pages.

Florensa et al., "Stochastic Neural Networks for Hierarchical Reinforcement Learning", Published as a conference paper at ICLR 2017, Apr. 2017, pp. 1-17.

Pham et al., "OptLayer—Practical Constrained Optimization for Deep Reinforcement Learning in the Real World", arXiv:1709.07643V2 [cs RO] Feb. 23, 2018, 8 pages.

Schlötzer, Susanne, "Hierarchical Reinforcement Learning", Institute of Automatic Control Engineering, Joint Advanced Student School, Mar. 2008, 38 pages.

Argali et al., "A Survey of Robot Learning from Demonstration", Robotics and Autonomous Systems, Oct. 2008, pp. 1-16.

Baram et al., "End-to-End Differentiable Adversarial Imitation Learning", Proceedings of the 34 th International Conference on Machine Learning, Aug. 2017, 10 pages.

Brys et al., "Reinforcement Learning from Demonstration through Shaping", Proceedings of the Twenty-Fourth International Joint Conference on Artificial Intelligence (IJCAI 2015), Jul. 2015, pp. 3352-3358.

Gao et al., "Reinforcement Learning from Imperfect Demonstrations", Proceedings of the 35th International Conference on Machine Learning, Jul. 2018, 13 pages.

Ho et al., "Generative Adversarial Imitation Learning", arXiv:1606.03476v1 [cs.LG] Jun. 10, 2016, pp. 1-14.

Kumar et al., "Rewards-Driven Robot Learning from Demonstrations", EDIC Research Proposal, Nov. 2013, pp. 1-9.

Ng et al., "Algorithms for Inverse Reinforcement Learning", 17th International Conf. on Machine Learning, Feb. 2000, 8 pages.

Ross et al., "A Reduction of Imitation Learning and Structured Prediction to No-Regret Online Learning", Proceedings of the 14th International Conference on Artificial Intelligence and Statistics (AISTATS) 2011, Apr. 2011, pp. 327-635.

Schulman et al., "Trust Region Policy Optimization", Proceedings of the 31st International Conference on Machine Learning, Jun. 2014, 16 pages.

Dalal et al., "Safe Exploration in Continuous Action Spaces", porarXiv: 1801.08757v1 [cs.AI] Jan. 26, 2018, 9 pages.

List of IBM Patents or Patent Applications Treated as Related dated Jul. 30, 2018, 2 pages.

Ma et al., "Improved Robustness and Safety for Autonomous Vehicle Control with Adversarial Reinforcement Learning", Jun. 26-30, 2018, 2018 IEEE Intelligent Vehicles Symposium (IV), pp. 1665-1671. (Year 2018).

U.S. Office Action issued in U.S. Appl. No. 16/048,810 dated Mar. 3, 2022, pp. 1-54.

* cited by examiner

ACTION SHAPING FROM DEMONSTRATION FOR FAST REINFORCEMENT LEARNING

BACKGROUND

Technical Field

The present invention generally relates to machine learning, and more particularly to action shaping from demonstration for fast reinforcement learning.

Description of the Related Art

It is desirable to acquire complex skills without explicit programming in certain applications including, but not limited to, decision-making, robotics, Internet of Things (IoT), and so forth. Artificial Intelligence (AI) can outperform humans or hardcoded policies in many of these applications. However, AI techniques can suffer from existing limitations of AI techniques include time and data requirements. For example, while Reinforcement Learning (RL) allows learning from trial and error, exploration to discover new strategies is time-consuming. Moreover, Supervised Learning (SL) enables fast training from expert demonstrations, but needs many examples covering state and action spaces. However, it is desirable to learn from a few imperfect demonstrations. Hence, there is a need for a way to minimize the demonstrations needed for fast reinforcement learning.

SUMMARY

According to an aspect of the present invention, a computer-implemented method is provided for reinforcement learning. The method includes obtaining, by a processor device, a first set and a second set of state-action tuples. Each of the state-action tuples in the first set represents a respective good demonstration, and each of the state-action tuples in the second set represents a respective bad demonstration. The method further includes training, by the processor device using supervised learning with the first set and the second set, a neural network which takes as input a state to provide an output. The output is parameterized to obtain each of a plurality of real-valued constraint functions used for evaluation of each of a plurality of action constraints. The method also includes training, by the processor device, a policy using reinforcement learning by restricting actions predicted by the policy according to each of the plurality of action constraints with each of the plurality of real-valued constraint functions.

According to another aspect of the present invention, a computer program product is provided for reinforcement learning. The computer program product includes a non-transitory computer readable storage medium having program instructions embodied therewith. The program instructions are executable by a computer to cause the computer to perform a method. The method includes obtaining, by a processor device, a first set and a second set of state-action tuples. Each of the state-action tuples in the first set represents a respective good demonstration, and each of the state-action tuples in the second set represents a respective bad demonstration. The method further includes training, by the processor device using supervised learning with the first set and the second set, a neural network which takes as input a state to provide an output. The output is parameterized to obtain each of a plurality of real-valued constraint functions used for evaluation of each of a plurality of action constraints. The method also includes training, by the processor device, a policy using reinforcement learning by restricting actions predicted by the policy according to each of the plurality of action constraints with each of the plurality of real-valued constraint functions.

According to yet another aspect of the present invention, a computer processing system is provided for reinforcement learning. The computer processing system includes a memory for storing program code. The computer processing system further includes a processor device operatively coupled to the memory for running the program code to obtain a first set and a second set of state-action tuples. Each of the state-action tuples in the first set represents a respective good demonstration, and each of the state-action tuples in the second set represents a respective bad demonstration. The processor device further runs the program code to train, using supervised learning with the first set and the second set, a neural network which takes as input a state to provide an output. The output is parameterized to obtain each of a plurality of real-valued constraint functions used for evaluation of each of a plurality of action constraints. The processor device also runs the program code to train a policy using reinforcement learning by restricting actions predicted by the policy according to each of the plurality of action constraints with each of the plurality of real-valued constraint functions.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to action shaping from demonstration for fast reinforcement learning.

In an embodiment, the present invention is configured to learn from a few imperfect demonstrations. In an embodiment, the present invention uses good and bad examples to learn action ranges by supervised learning. These action ranges are then used to restrict exploration during reinforcement learning. In this way, training is faster, and the trained policy can enrich the demonstrations.

Hence, in an embodiment, an approach is provided for fast reinforcement learning that learns action shaping from a few demonstrations in order to learn a policy that can outperform the demonstrations. The few demonstrations from which action shaping is learned are not required to be optimal.

Figure 1:
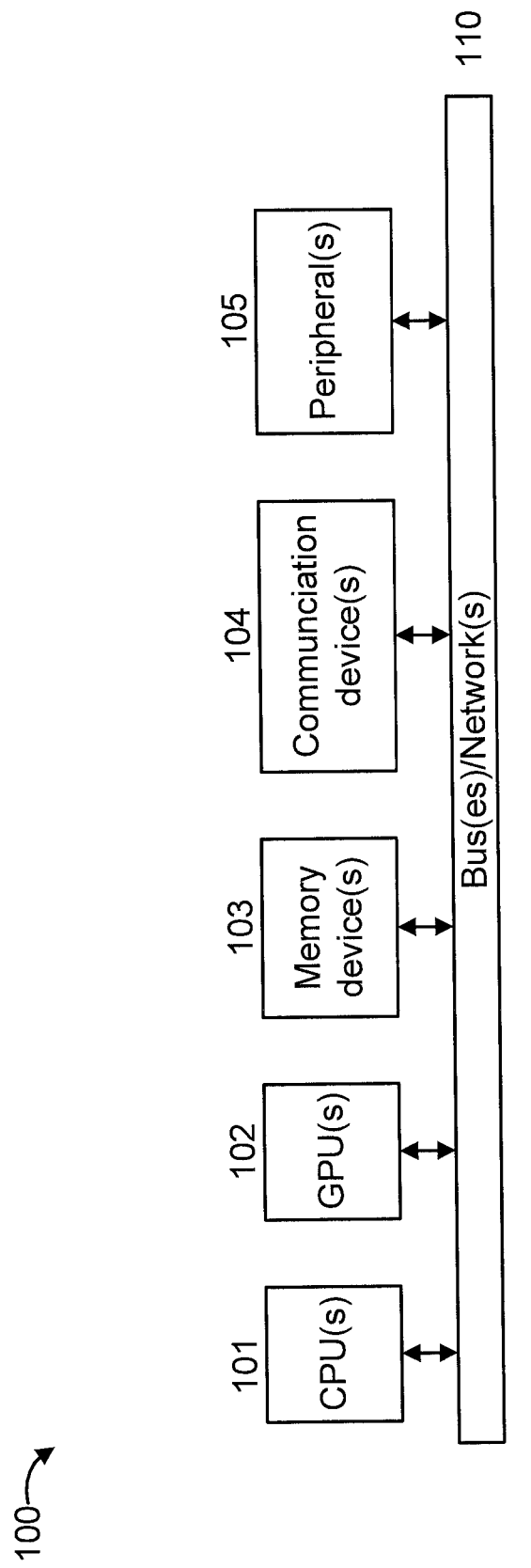
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "constraint" refers to a condition that an action has to satisfy in order to be considered valid with respect to a given task. Such a constraint can be formulated as satisfying a Boolean function that can involve inequalities, equalities, or combinations thereof. Thus, for example, for robotic applications, constraints can include and/or otherwise relate, but are not limited to, avoiding collisions while traveling to a target, maintaining power consumption within a chosen level, and/or fulfilling other performance or safety metrics. For Advanced Driver Assistance Systems (ADAS), constraints can include and/or otherwise relate, but are not limited to, avoiding collisions while traveling to a target, following a chosen route, complying with local speed limits, and other traffic rules. The preceding constraints are merely illustrative and depend upon the application, as readily appreciated by one of ordinary skill in the art given the teachings of the present invention herein, while maintaining the spirit of the present invention.

Also as used herein, the term "constraint function" refers to a Boolean function that can involve inequalities, equalities, or combinations thereof, characterized by constraint parameters, such as real-valued numbers. The value of the constraint function defines the satisfaction or violation of the constraints that can be imposed on raw actions to obtain constrained actions.

Figure 2:
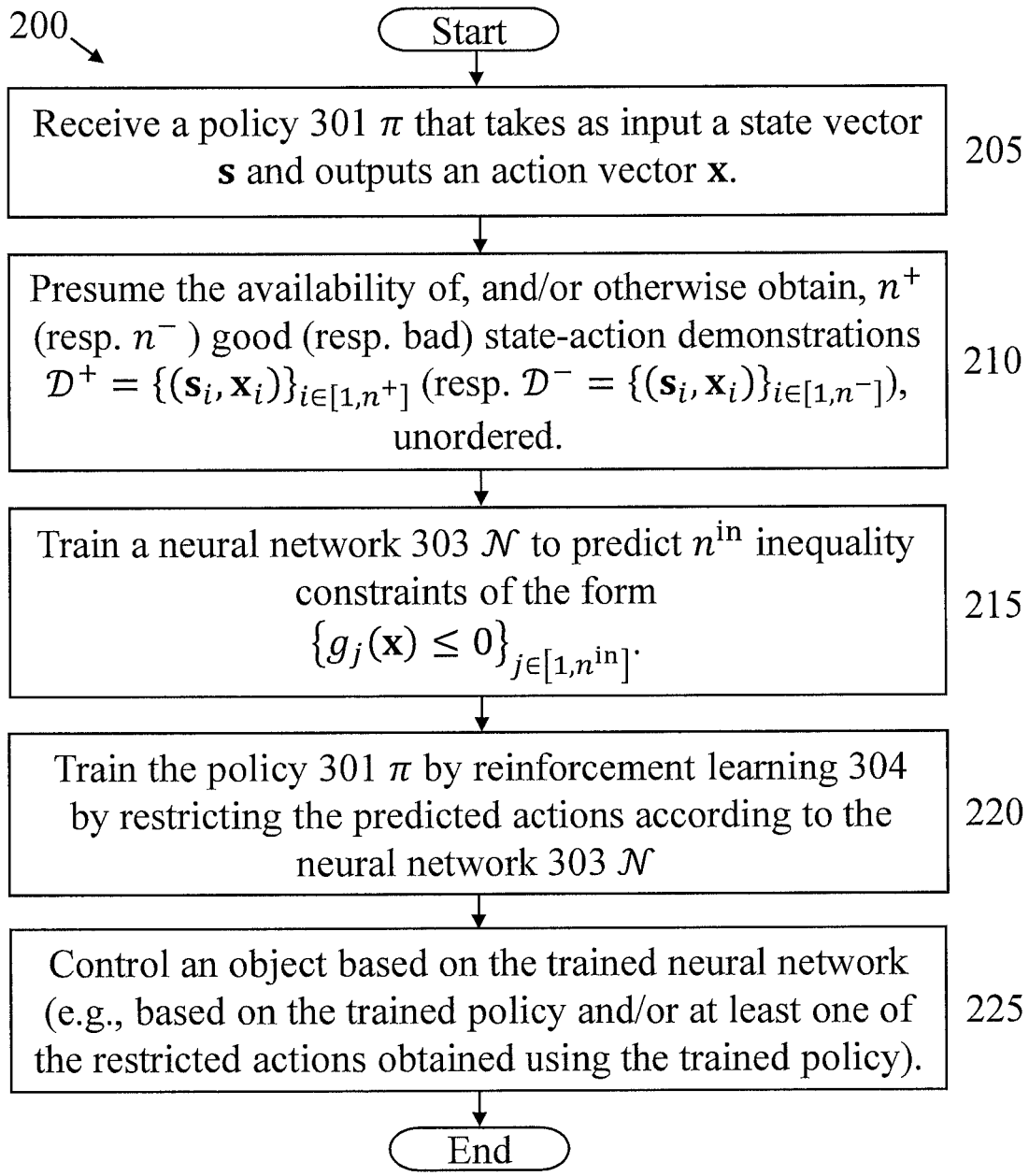
FIG. 2 is flow diagram showing an exemplary method for action shaping from demonstration for fast reinforcement learning, in accordance with an embodiment of the present invention.
Figure 3:
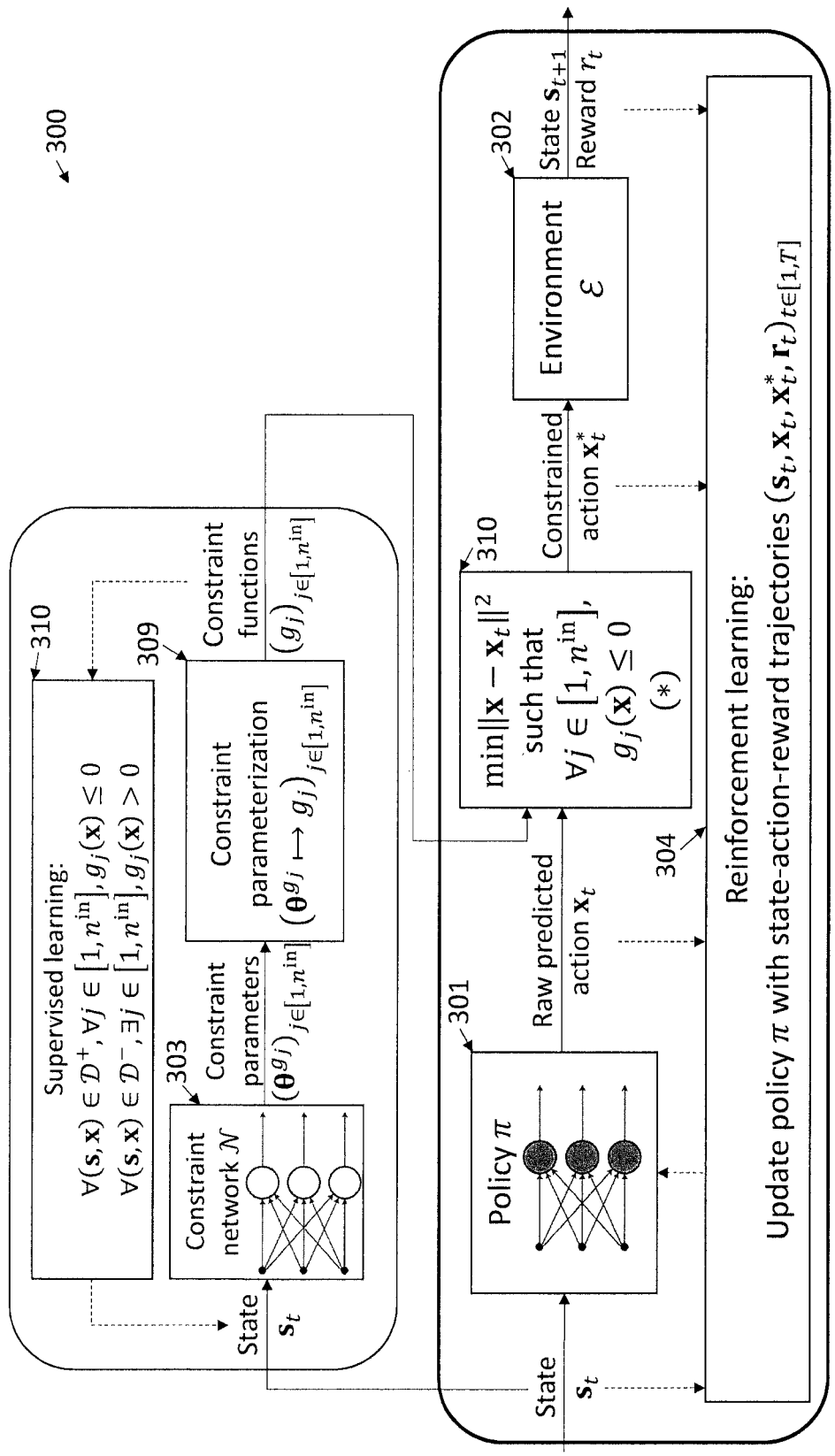
FIG. 3 is a high-level block diagram showing an exemplary system for action shaping from demonstration for fast reinforcement learning, in accordance with an embodiment of the present invention.

FIG. 2 is flow diagram showing an exemplary method 200 for action shaping from demonstration for fast reinforcement learning, in accordance with an embodiment of the present invention. FIG. 3 is a high-level block diagram showing an exemplary system 300 for action shaping from demonstration for fast reinforcement learning, in accordance with an embodiment of the present invention. For the sake of illustration, the system 300 is described with respect to method 200. Method 200 of FIG. 2 can be considered a more general representation of method 500 of FIG. 5.

Referring to FIGS. 2 and 3, at block 205, receive a policy 301 $\pi$ that takes as input a state vector s and outputs an action vector x. Thus, given an environment 302 $\varepsilon$ at time t, executing $x_t = \pi(s_t)$ yields a reward $r_t$ and a new state $s_{t+1}$.

At block 210, presume the availability of, and/or otherwise obtain, $n^+$ (resp. $n^-$) good (resp. bad) state-action demonstrations $D^+ = \{(s_i, x_i)\}_{i \in [1, n^+]}$ (resp. $D^- = \{(s_i, x_i)\}_{i \in [1, n^-]}$), unordered. A good demonstration is a state-action tuple produced by a proficient agent attempting to solve the task. A good demonstration does not need to be optimal in some sense (e.g., sum of discounted rewards). A bad demonstration is a state-action tuple produced by an agent towards failing the task.

At block 215, train a neural network 303 $\mathcal{N}$ to predict $n^{in}$ inequality constraints of the form $\{g_j(x) \leq 0\}_{j \in [1, n^{in}]}$. To that end:

Each $g_i$ is a real-valued function parameterized by $\theta^{g_i}$ (using constraint parameterizer 309).

$\mathcal{N}$ takes as input a state vector s and outputs $(\theta^{g_j})_{j \in [1, n^{in}]}$.

$\mathcal{N}$ is trained by supervised learning 310 using a loss such that:

Good demonstrations satisfy all constraints: $\forall (s,x) \in \mathcal{D}^+$, $\forall j \in [1, n^{in}]$, $g_j(x) \leq 0$.

Bad demonstrations violate at least one constraint: $\forall (s, x) \in \mathcal{D}^-$, $\exists j \in [1, n^{in}] g_j(x) > 0$.

At block 220, train the policy 301 $\pi$ by reinforcement learning 304 by restricting the predicted actions according to the neural network 303 $\mathcal{N}$. To that end:

Given a current state $s_t$, predict $x_t = \pi(s_t)$ and $(\theta^{g_j})_{j \in [i, n^{in}]} = \mathcal{N}(s_t)$.

By numerical optimization 310, compute $x^*_t = \mathrm{argmin}_x \|x - x_t\|^2$ such that $\forall j \in [1, n^{in}]$, $g_j(x) \leq 0$.

Execute $x^*_t$ on the environment to obtain a reward $r_t$ and a new state $s_{t+1}$.

Train the policy 301 $\pi$ by reinforcement learning using the obtained state-action-reward trajectories $(s_t, x_t, x^*_t, r_t)_{t \in [1, T]}$.

At block 225, control an object based on the trained neural network (e.g., based on the trained policy and/or at least one of the restricted actions obtained using the trained policy). The object can be, for example, but not limited to, a hardware object. The hardware object can be, but is not limited to, a computer, a workplace machine, a robot, a vehicle (e.g., a car, etc.), and so forth. The action can be performed to, for example, make the robot perform an operation (such as manufacturing another object), controlling the workplace machine to mitigate a potential harm to a user thereof, and so forth. In an embodiment, the restricted action provides a better result than if the action was not restricted in accordance with the present invention. For example, in the case of reaching a target, the restricted action can result in reaching the target faster than an corresponding unrestricted version of the action (e.g., by avoiding a path having extra unnecessary steps in order to arrive at a target location and/or target object). In the case of a computer, the action can be to bypass a computer operation that is likely not to improve an outcome provided by the computer in order to improve operation of the computer by avoiding wasting resources that would otherwise be consumed by performing the bypassed operation. These and other actions are readily contemplated by one of ordinary skill in the art, given the teachings of the present invention provided herein, while maintaining the spirit of the present invention.

Figure 4:
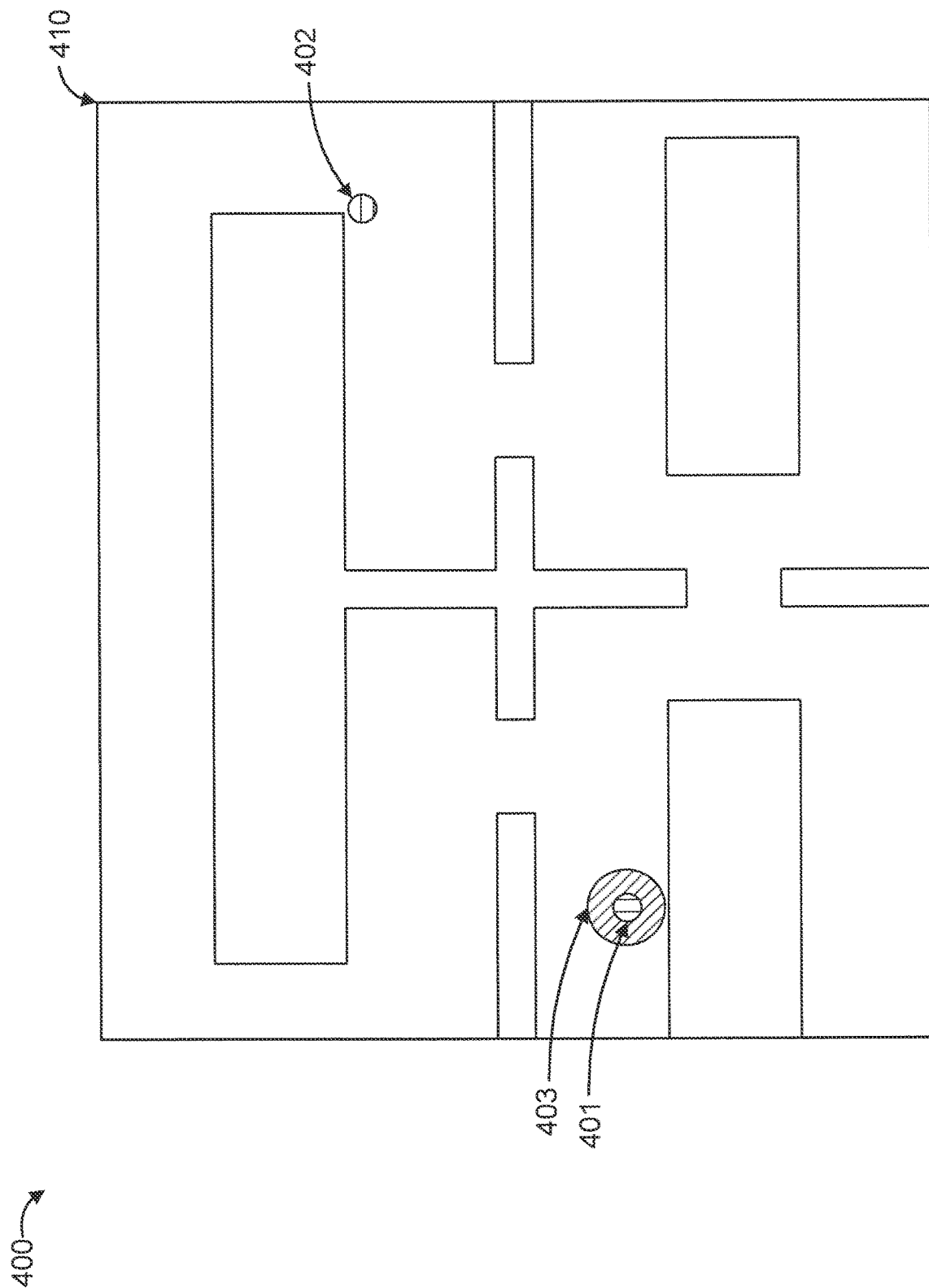
FIG. 4 is a block diagram showing an exemplary environment to which the present invention can be applied, in accordance with an embodiment of the present invention.

FIG. 4 is a block diagram showing an exemplary environment 400 to which the present invention can be applied, in accordance with an embodiment of the present invention.

The environment 400 includes a two-dimensional (2D) maze 410 with continuous actions, as follows:

Goal: move agent $(x_a, y_a)$ to target $(x_t, y_t)$ without touching walls or exiting the environment borders $[-1,1] \times [-1,1]$ State of dim $n^s=4$: agent position, target relative position $$S = (x_a, y_a, x_t - x_a, y_t - y_a)$$

Action of dim $n^x=2$: agent position increment $(\Delta x_a, \Delta y_a)$ $$x = (\Delta x_a, \Delta y_a)$$

Regarding data collection, the following applies:
Circle with vertical hatching: agent 401.
Circle with horizontal hatching: target 402.
Circle with diagonal hatching: action range 403.

Figure 5:
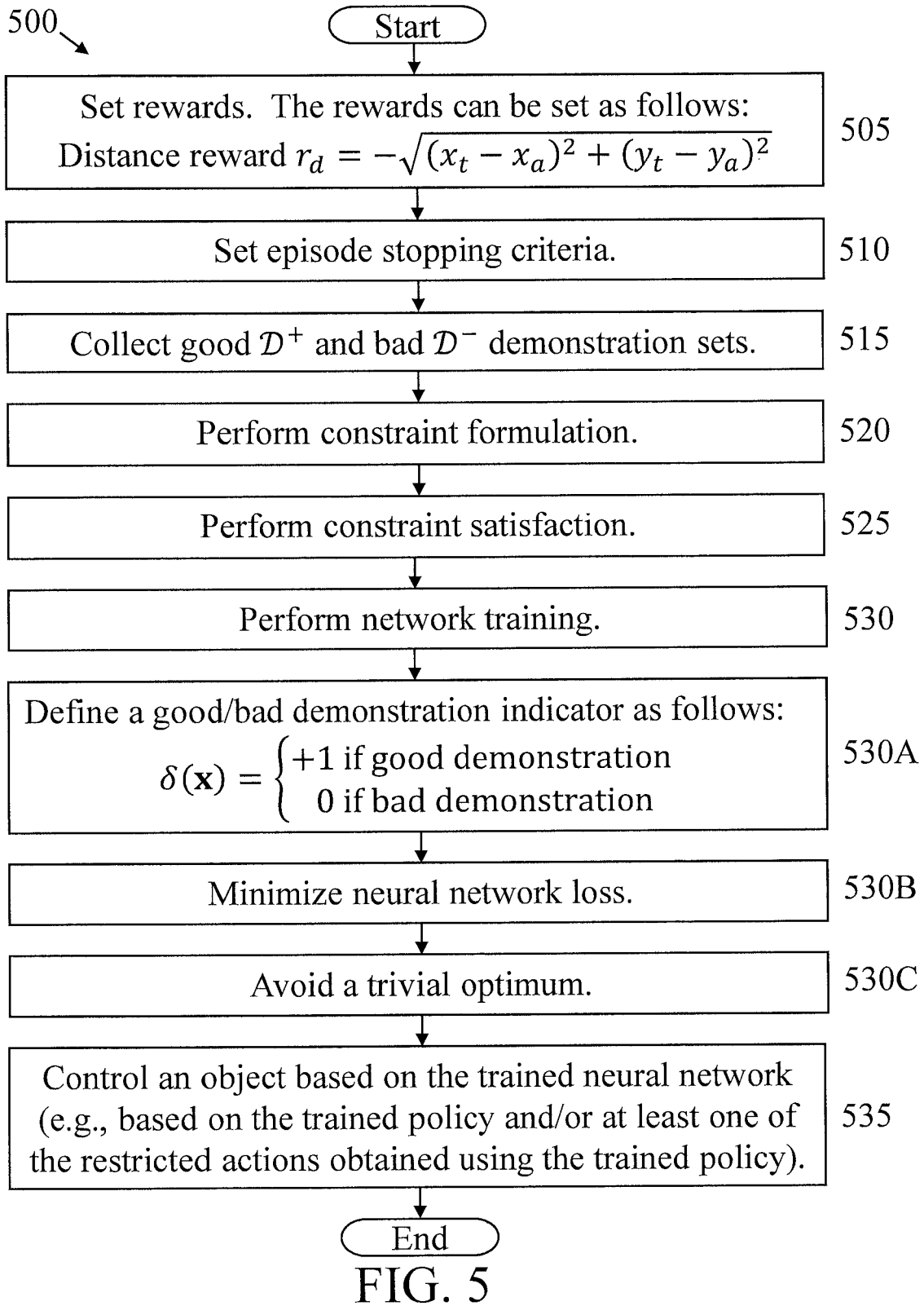
FIG. 5 is a flow diagram showing an exemplary method for action shaping from demonstration for fast reinforcement learning, in accordance with an embodiment of the present invention.

FIG. 5 is a flow diagram showing an exemplary method 500 for action shaping from demonstration for fast reinforcement learning, in accordance with an embodiment of the present invention. For the sake of illustration, the method 500 is described with respect to environment 400. However, other environments can also be used, as readily appreciated by one of ordinary skill in the art, given the teachings of the present invention provided herein, while maintaining the spirit of the present invention.

Referring to FIGS. 4 and 5, at block 505, set rewards. In an embodiment, the rewards can be set as follows:

$$\text{Distance reward } r_d = -\sqrt{(x_t - x_a)^2 + (y_t - y_a)^2}$$

If the agent touches a wall or exits borders, penalty $r_c = -200$.
If the agent touches the target, bonus $r_t = 100$.

It is to be appreciated that other reward functions and values can be used, given the teachings of the present invention provided herein, while maintaining the spirit of the present invention.

At block 510, set episode stopping criteria. For example, stop the episode if agent reaches target, touches a wall, exits borders, or after T=100 steps.

At block 515, collect good $\mathcal{D}^+$ and bad $\mathcal{D}^-$ demonstration sets.

For example, collect $n^{traj}$ good trajectories starting from random agent and target positions (e.g., $n^{traj}=500$, by human demonstration). The demonstrations do not need to be optimal in terms of shortest path or number of steps. The value of 500 for $n^{traj}$ is used for the sake of illustration and, thus, other values can also be used.

At each step i, automatically generate bad examples as follows:
With $x_i^+$ the good action at state $s_i$, leading to state $s_{i+1}$, add $x_{i+1}^{-,0} = -x_i^+$ as bad action at $s_{i+1}$ (i.e., going back)
From every state $s_i$, by grid search, sample actions $x_i^{-,j}$ that would lead to collision with an obstacle or exiting the environment.

At block 520, perform constraint formulation. For example, consider linear constraints, such that $\{g_j(x) \leq 0\}_{j=1,\ldots,n^{in}}$ can be written as $Gx - h \leq 0$, with real-valued matrix G of size $n^{in} \times n^x$ and h of size $n^{in}$ (e.g., $n^{in}=2$). Train a constraint network $\mathcal{N}$ such that $(G, h) = \mathcal{N}(s)$.

At block 525, perform constraint satisfaction. For example, in an embodiment, the following can apply relative to constraint satisfaction:

Violation margin $M^-(s,x) = \max(0, Gx-h)$.
Satisfaction margin $M^+(s,x) = \max(0, h-Gx)$.
Each row j of $M^-(s,x)$ (resp. $M^+(s, x)$) is positive if constraint j is violated (resp. satisfied), otherwise zero.

Further regarding constraint satisfaction, the following loss terms can apply:

For $x \in \mathcal{D}^+$, no constraint must be violated. The following can be the goal:

$$l^+(s,x) = \max_{j \in [1,n^{in}]} \{M_j^-(s,x)\} = 0$$

For $x \in \mathcal{D}^-$, one constraint must be unsatisfied. The following can be the goal:

$$l^-(s,x) = \max_{j \in [1,n^{in}]} \{M_j^+(s,x)\} = 0$$

At block 530, perform network training.
In an embodiment, block 530 can include one or more of blocks 530A, 530B, and 530C.

At block 530A, define a good/bad demonstration indicator as follows:

$$\delta(x) = \begin{cases} +1 & \text{if good demonstration} \\ 0 & \text{if bad demonstration} \end{cases}$$

At block 530B, minimize neural network loss. In an embodiment, neural network loss can be minimized as follows:

$$l(s,x) = \delta(x) \max\{M^-(s,x)\} + (1-\delta(x))\min\{M^+(s,x)\}$$

Minimizing $l(s, x)$ leads to attempting to satisfy all constraints for good demonstrations and violate at least one constraint for bad demonstrations. In an embodiment, minimization is performed using the Adam optimization algorithm. Of course, other techniques/algorithms can also be used, while maintaining the spirit of the present invention.

At block 530C, avoid a trivial optimum.
For example, in an embodiment, $l(s, x)$ can be trivially minimized with $G, h \to 0$.

We enforce each row of G to be of unit norm:
$\|h - Gx\|$ can then be geometrically interpreted as the distance from x to the hyperplane $Gx - h = 0$.

Predict each row j of G in spherical coordinates. For example, in 2D: $(r, \theta) \to r(\cos \theta, \sin \theta)$; generalizes to N-D. Enforce $r=1$ for the unit sphere: only predict $n^{in} \times (n^x-1)$ terms to construct G of size $n^{in} \times n^x$.

At block 535, control an object based on the trained neural network (e.g., based on the trained policy and/or at least one of the restricted actions obtained using the trained policy).

A description will now be given regarding some exemplary applications to which the present invention can be applied, in accordance with an embodiment of the present invention.

For example, the present invention can be used for robotics applications, a music recommendation system, factory management, garbage combustion, Advanced Driver Assistance Systems (ADAS), and so forth.

Further regarding robotics applications, the present invention can be applied to optimize balance, optimize maze solving, and so forth.

Further regarding a music recommendation system, the present invention can be used to minimize the user skipping songs, maximize the available and/or played "song variety", and so forth.

Further regarding factory management, the present invention can be used to keep production quality above a certain level, minimize energy costs, maximize worker happiness, and so forth.

Further regarding garbage combustion, the present invention can be used to maintain temperature at a certain level, minimize garbage segregation work, and so forth.

Further regarding ADAS, the present invention can be used to avoid collisions, control vehicle systems (e.g., in order to arrive at a target destination and/or to avoid collisions). The vehicle functions that can be controlled include, but are not limited to, acceleration, braking, steering, and so forth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
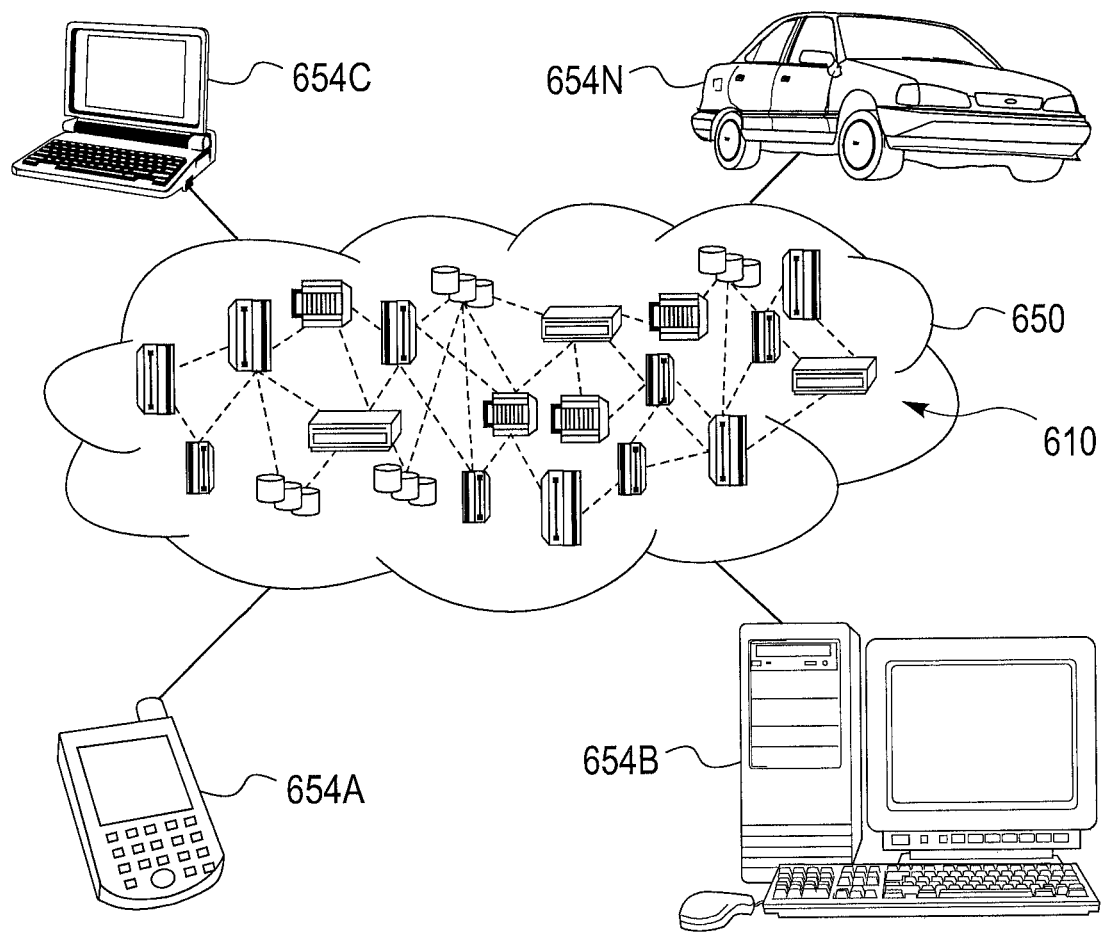
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
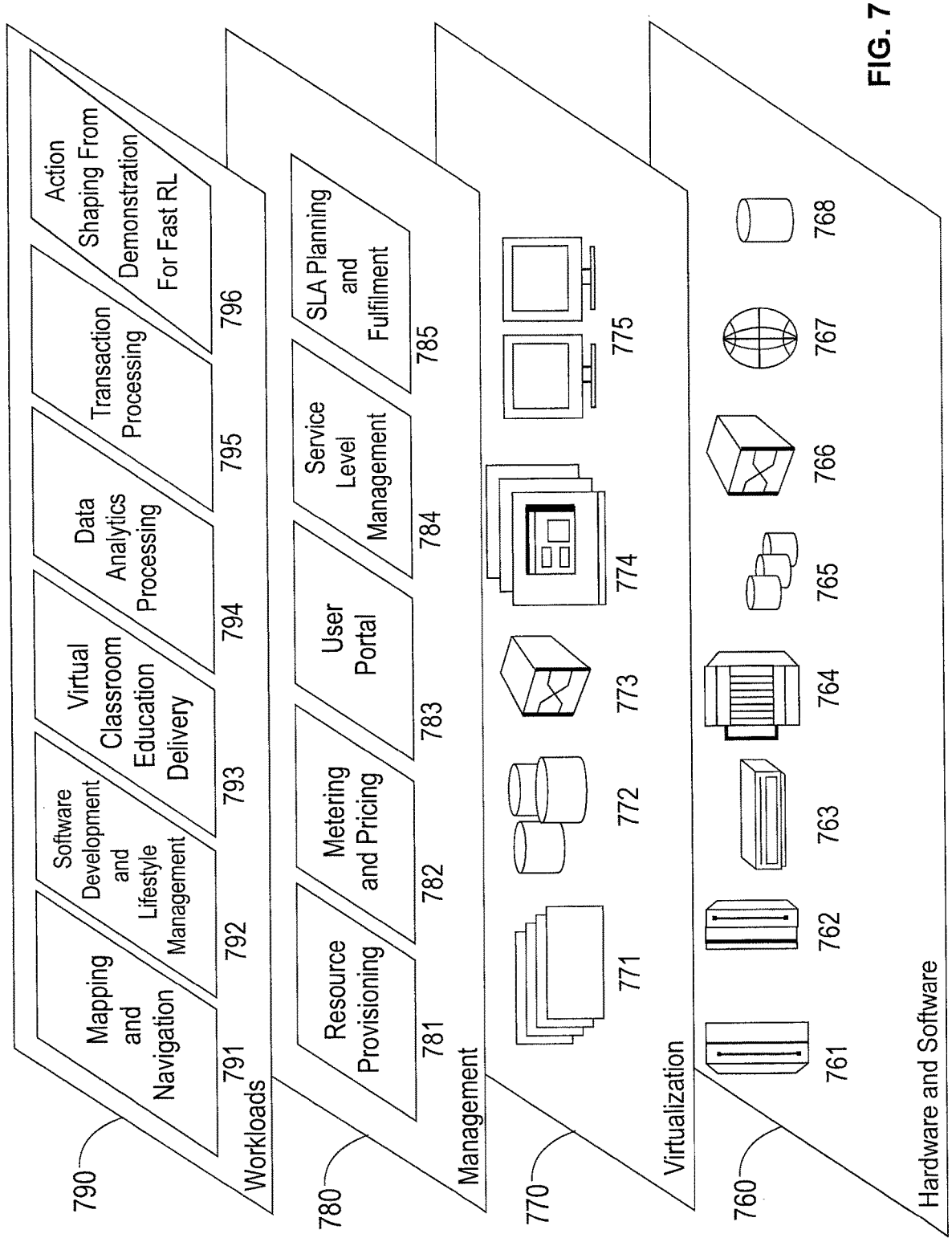
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and action shaping from demonstration for fast reinforcement learning 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reinforcement learning, comprising:
  obtaining, by a processor device, a first set and a second set of state-action tuples, each of the state-action tuples in the first set representing a respective good demonstration, and each of the state-action tuples in the second set representing a respective bad demonstration;
  training, by the processor device using supervised learning with the first set and the second set to minimize a neural network loss, a neural network which takes as input a state to provide an output, the output being parameterized to obtain each of a plurality of real-valued constraint functions used for evaluation of each of a plurality of action constraints; and
  training, by the processor device, a policy using reinforcement learning by restricting actions during exploration which are predicted by the policy according to each of the plurality of action constraints with each of the plurality of real-valued constraint functions such that restricted actions result in a goal being reached faster than unrestricted actions by bypassing a computer operation unlikely to improve a computer output relating to the goal while avoiding wasting computer resources consumed by performing the bypassed computer operation,
  wherein the neural network loss is minimized by satisfying all constraints for good demonstrations in the first set while violating at least one constraint for bad demonstrations in the second set.

2. The computer-implemented method of claim 1, wherein the neural network is trained such that the first set satisfies each of the plurality of action constraints and the second set violates at least one of the plurality of action constraints, evaluated with each of the plurality of real-valued constraint functions.

3. The computer-implemented method of claim 1, wherein training the policy comprises calculating, by using each of the plurality of real-valued constraint functions, an action closest to the action predicted by the policy among actions which satisfy each of the plurality of action constraints and executing the calculated action on an environment to obtain a reward for the reinforcement learning.

4. The computer-implemented method of claim 1, wherein of the plurality of action constraints is an inequality constraint.

5. The computer-implemented method of claim 1, wherein the first set is relaxed to allow non-optimal demonstrations that are directed closer towards succeeding than failing.

6. The computer-implemented method of claim 1, wherein the evaluation of each of the plurality of action constraints is performed relative to a violation margin and a satisfaction margin, wherein for a given one of the restricted actions, the violation margin represents a margin of violation between the action and the plurality of action constraints, and the satisfaction margin represents a margin of satisfaction between the action and the plurality of action constraints.

7. The computer-implemented method of claim 1, wherein the first set and the second set of state-action tuples are used as action ranges during the exploration in the reinforcement learning.

8. A computer program product for reinforcement learning, the computer program product comprising a non-transitory computer readable storage medium having program instructions embodied therewith, the program instructions executable by a computer to cause the computer to perform a method comprising:
obtaining, by a processor device, a first set and a second set of state-action tuples, each of the state-action triples in the first set representing a respective good demonstration, and each of the state-action tuples in the second set representing a respective bad demonstration;
training, by the processor device using supervised learning with the first set and the second set, to minimize a neural network loss, a neural network which takes as input a state to provide an output, the output being parameterized to obtain each of a plurality of real-valued constraint functions used for evaluation of each of a plurality of action constraints; and
training, by the processor device, a policy using reinforcement learning by restricting actions during exploration which are predicted by the policy according to each of the plurality of action constraints with each of the plurality of real-valued constraint functions such that restricted actions result in a goal being reached faster than unrestricted actions by bypassing a computer operation unlikely to improve a computer output relating to the goal while avoiding wasting computer resources consumed by performing the bypassed computer operation,
wherein the neural network loss is minimized by satisfying all constraints for good demonstrations in the first set while violating at least one constraint for bad demonstrations in the second set.

9. The computer program product of claim 8, wherein the neural network is trained such that the first set satisfies each of the plurality of action constraints and the second set violates at least one of the plurality of action constraints, evaluated with each of the plurality of real-valued constraint functions.

10. The computer program product of claim 8, wherein training the policy comprises calculating, by using each of the plurality of real-valued constraint functions, an action closest to the action predicted by the policy among actions which satisfy each of the plurality of action constraints and executing the calculated action on an environment to obtain a reward for the reinforcement learning.

11. The computer program product of claim 8, wherein each of the plurality of action constraints is an inequality constraint.

12. The computer program product of claim 8, wherein the first set is relaxed to allow non-optimal demonstrations that are directed closer towards succeeding than failing.

13. The computer program product of claim 8, wherein the evaluation of each of the plurality of action constraints is performed relative to a violation margin and a satisfaction margin, wherein for a given one of the restricted actions, the violation margin represents a margin of violation between the action and the plurality of action constraints, and the satisfaction margin represents a margin of satisfaction between the action and the plurality of action constraints.

14. The computer program product of claim 8, wherein the first set and the second set of state-action tuples are used as action ranges during the exploration in the reinforcement learning.

15. A computer processing system for reinforcement learning, comprising:
a memory for storing program code; and
a processor device operatively coupled to the memory for running the program code to
obtain a first set and a second set of state-action tuples, each of the state-action tuples in the first set representing a respective good demonstration, and each of the state-action tuples in the second set representing a respective bad demonstration;
train, using supervised learning with the first set and the second set to minimize a neural network loss, a neural network which takes as input a state to provide an output, the output being parameterized to obtain each of a plurality of real-valued constraint functions used for evaluation of each of a plurality of action constraints; and
train a policy using reinforcement learning by restricting actions during exploration which are predicted by the policy according to each of the plurality of action constraints with each of the plurality of real-valued constraint functions such that restricted actions result in a goal being reached faster than unrestricted actions by bypassing a computer operation unlikely to improve a computer output relating to the goal while avoiding wasting computer resources consumed by performing the bypassed computer operation,
wherein the neural network loss is minimized by satisfying all constraints for good demonstrations in the first set while violating at least one constraint for bad demonstrations in the second set.

16. The computer processing system of claim 15, wherein the processor device trains the neural network such that the first set satisfies each of the plurality of action constraints and the second set violates at least one of the plurality of action constraints, evaluated with each of the plurality of real-valued constraint functions.

17. The computer processing system of claim 15, wherein the processor device trains the policy by calculating, by using each of the plurality of real-valued constraint functions, an action closest to the action predicted by the policy among actions which satisfy each of the plurality of action constraints and executing the calculated action on an environment to obtain a reward for the reinforcement learning.

18. The computer processing system of claim 15, wherein each of the plurality of action constraints is an inequality constraint.

19. The computer processing system of claim 15, wherein the first set is relaxed to allow non-optimal demonstrations that are directed closer towards succeeding than failing.

20. The computer processing system of claim 15, wherein the evaluation of each of the plurality of action constraints is performed relative to a violation margin and a satisfaction margin, wherein for a given one of the restricted actions, the violation margin represents a margin of violation between the action and the plurality of action constraints, and the satisfaction margin represents a margin of satisfaction between the action and the plurality of action constraints.

* * * * *